United States Patent [19]

Hadfield

[11] Patent Number: 5,021,608

[45] Date of Patent: Jun. 4, 1991

[54] ACTIVATING UNDERCARPET CABLE FROM INFLOOR CONDUCTORS

[75] Inventor: Robert W. Hadfield, Parkersburg, W. Va.

[73] Assignee: Butler Manufacturing Company, Kansas City, Mo.

[21] Appl. No.: 437,736

[22] Filed: Nov. 17, 1989

[51] Int. Cl.⁵ .............................................. H02G 3/12
[52] U.S. Cl. ..................................... 174/48; 439/492
[58] Field of Search ............... 174/48, 49, 71 R, 72 R, 174/72 C; 439/492, 925

[56] References Cited

U.S. PATENT DOCUMENTS

| | | | |
|---|---|---|---|
| 4,030,801 | 6/1977 | Bunnell | 174/48 X |
| 4,289,370 | 9/1981 | Storck | 174/48 X |
| 4,387,949 | 6/1983 | Haitmanek | 174/48 X |
| 4,746,768 | 5/1988 | Benscoter | 174/48 |

Primary Examiner—Leo P. Picard
Assistant Examiner—David A. Tone
Attorney, Agent, or Firm—Frederick J. Olsson

[57] ABSTRACT

A junction splice and an adaptor for electrically connecting the flat conductors of under carpet cable with the round power conductors from an underfloor raceway or a pokethru.

12 Claims, 5 Drawing Sheets

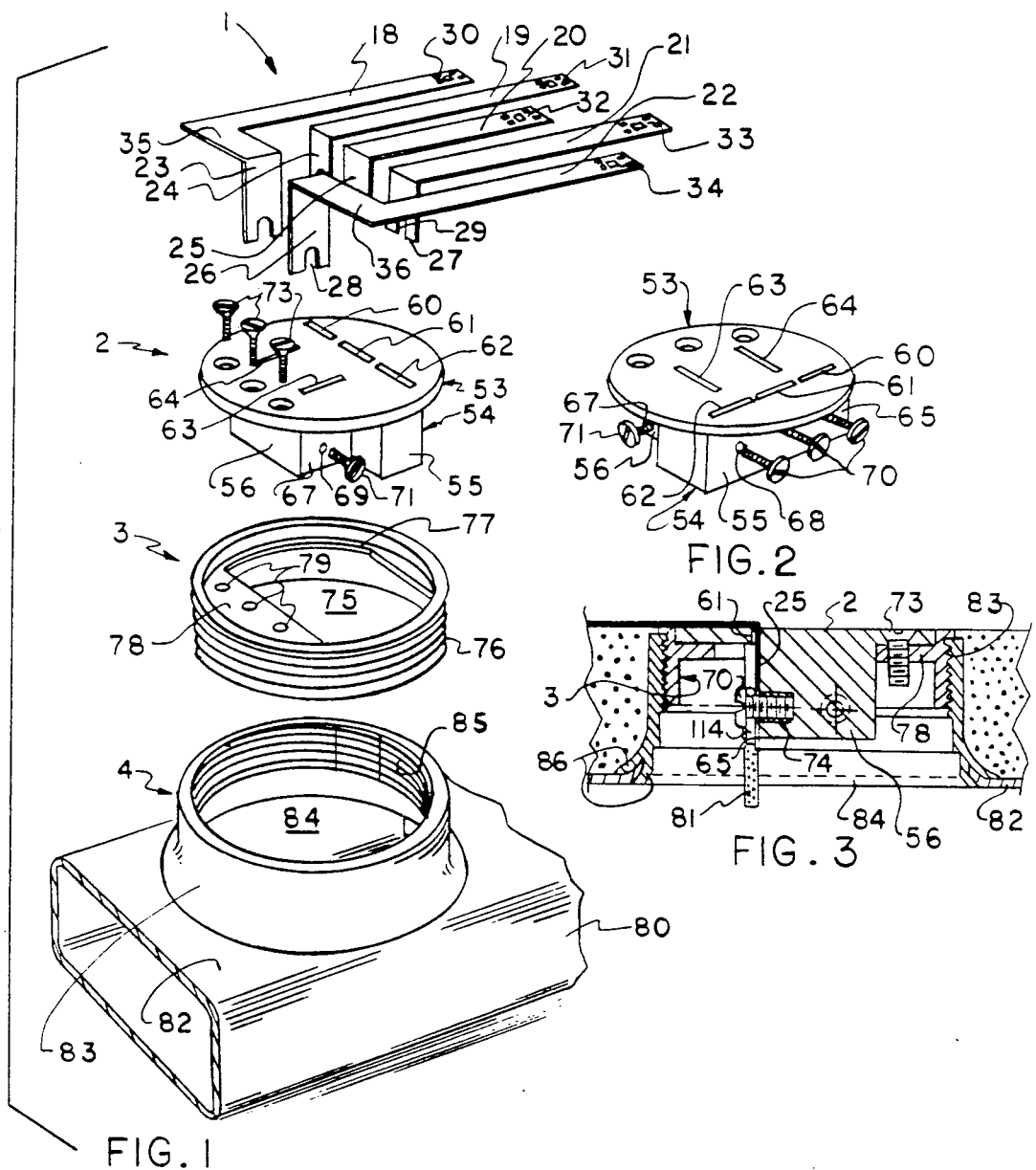

5,021,608

ACTIVATING UNDERCARPET CABLE FROM INFLOOR CONDUCTORS

This invention relates in general to electrical underfloor of infloor systems for power and communication distribution in buildings.

More particularly the invention relates to activating flat power conductors of flat conductor cable on the surface of a floor from the round power conductors in a raceway system embedded in the floor or from the round power conductors in a power distribution system underneath the floor.

For such activation purposes, the invention contemplates a flat conductor splice on the floor surface and an adaptor mounted within the floor, the adaptor being especially configured to be joined both to the splice and to the round power conductors and electrically interconnect the same and further the adaptor being configured for securement to any one of different forms of housing means by which the adaptor can receive power conductors from an underfloor duct insert (the preset or afterset type) or from a poke-thru.

The invention will be described below in connection with the following drawings wherein:

FIG. 1 is an exploded view illustrating the invention as employed with a preset on a power raceway;

FIG. 2 is a perspective view illustrating the adaptor employed in the assemblage of FIG. 1;

FIG. 3 is a fragmentary view illustrating certain of the components of FIG. 1 as mounted in a concrete floor;

FIG. 4 is a plan view of a flat conductor one end of which has barbs and the opposite end of which is bent at right angles;

FIG. 5 is a sectional view taken along the lines 5—5 of FIG. 4 and illustrating the barbs;

First, in connection with FIGS. 1, 6, 7, and 8, I will note the various components employed when the invention is applied to underfloor ducts and to a poke-thru.

In FIG. 1 the numeral 1 designates an array of five flat conductors the numeral 2 designates an adaptor, the numeral 3 designates an adaptor housing, and the numeral 4 designates a mounting means for the adaptor housing which in this case includes a preset.

Figure 6:
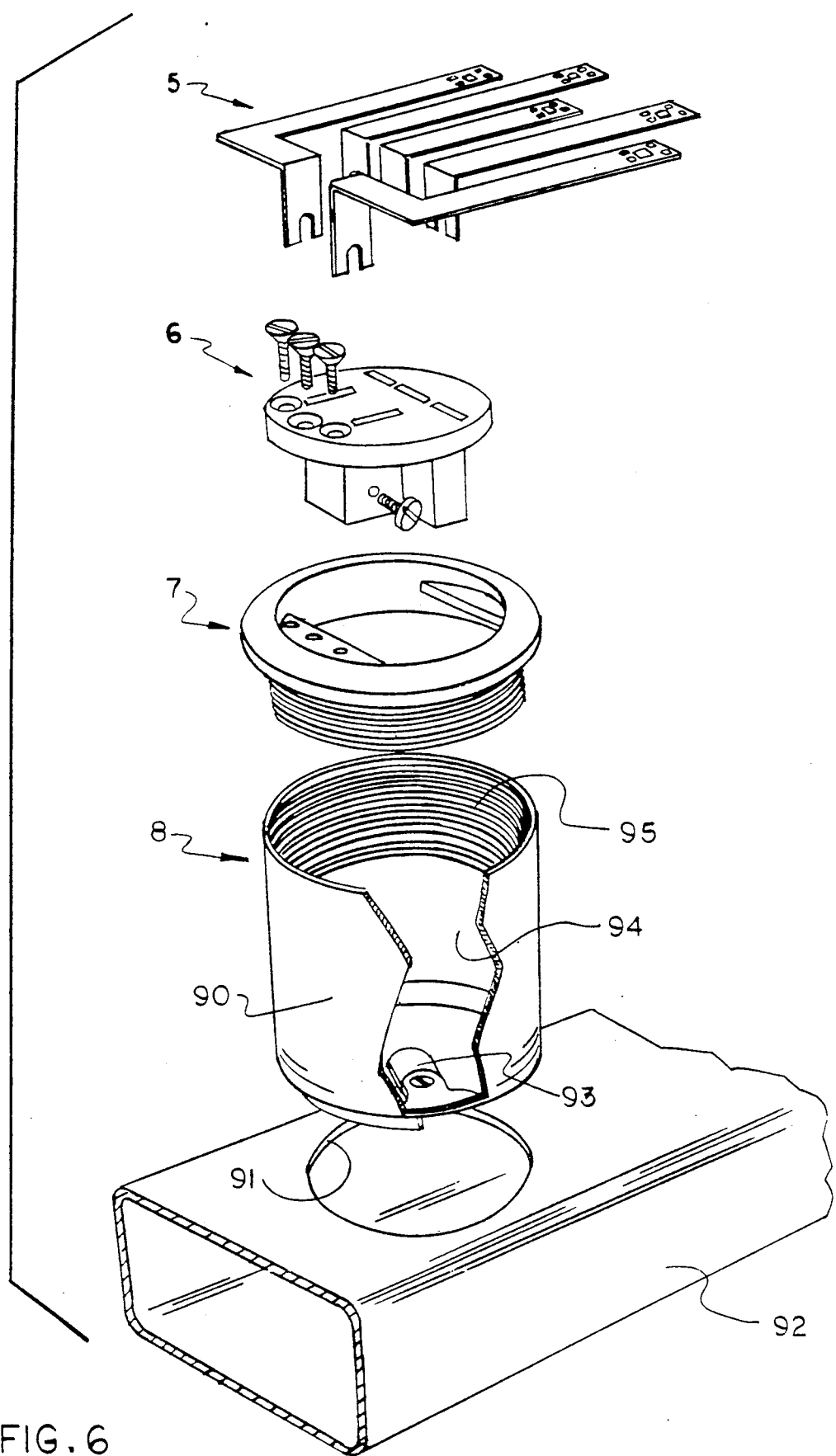
FIG. 6 is an exploded view illustrating the invention as employed with an afterset on a power raceway.

In FIG. 6 the numeral 5 designates an array for five flat conductors which normally will have the same structure as array 1, the numeral 6 designates an adaptor which normally will have the same structure as adaptor 2, the numeral 7 designates an adaptor housing which normally will have the same structure 2 as housing 3 and the numeral 8 designates mounting means for the adaptor housing which in this case includes an afterset.

Figure 7:
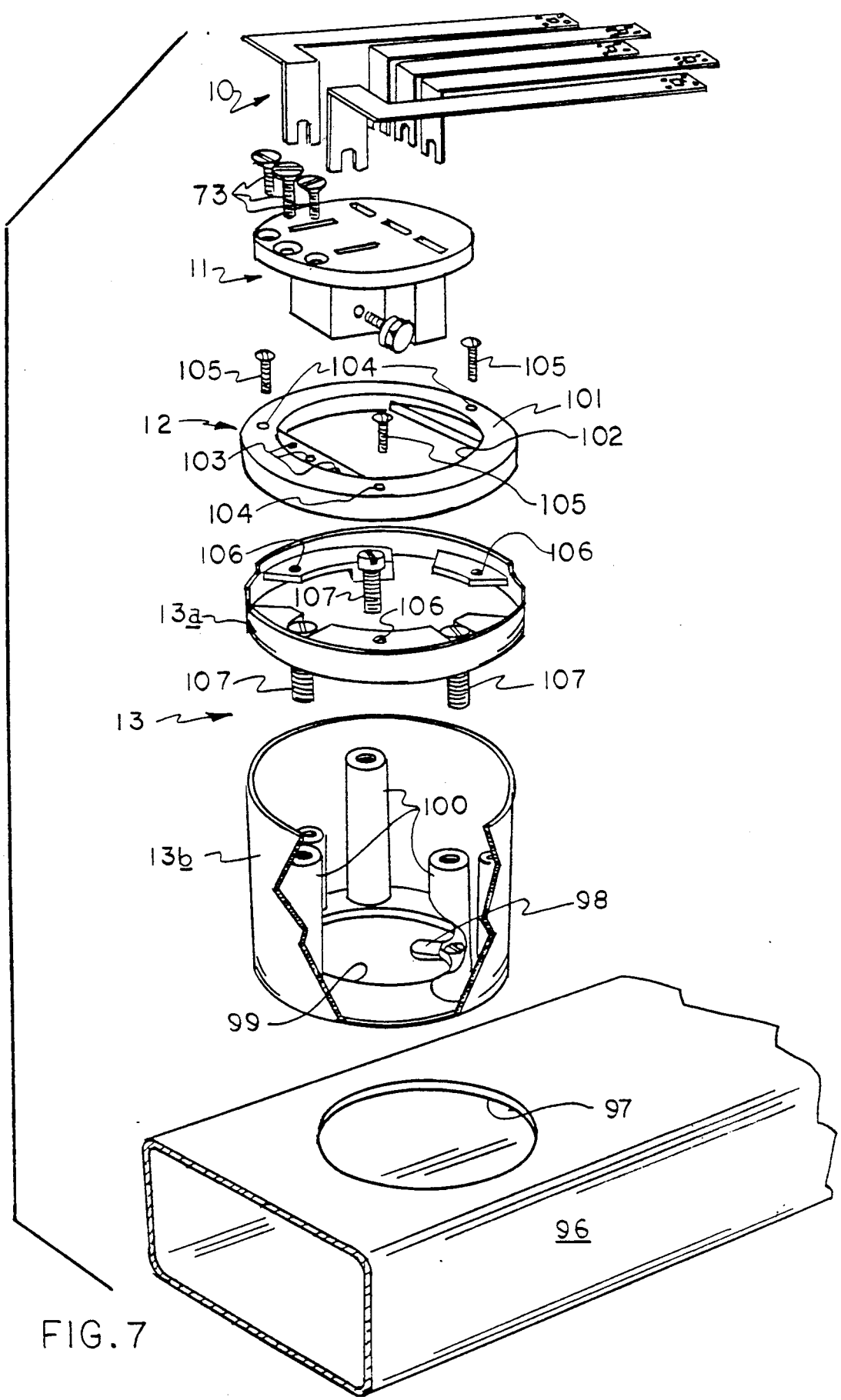
FIG. 7 is an exploded view of the invention as employed with an afterset on a power raceway.

In FIG. 7 the numeral 10 designates an array of flat conductors which normally will have the same structure as the conductors of the array 1, the numeral 11 designates an adaptor which normally will have structure similar to the adaptor 2, the numeral 12 designates an adaptor housing which has a structure different from the housings 3 and 7 but serves the same general purpose and the numeral 13 designates mounting means for the adaptor housing. The mounting means 13 includes the adjusting ring 13a and the afterset 13b.

Figure 8:
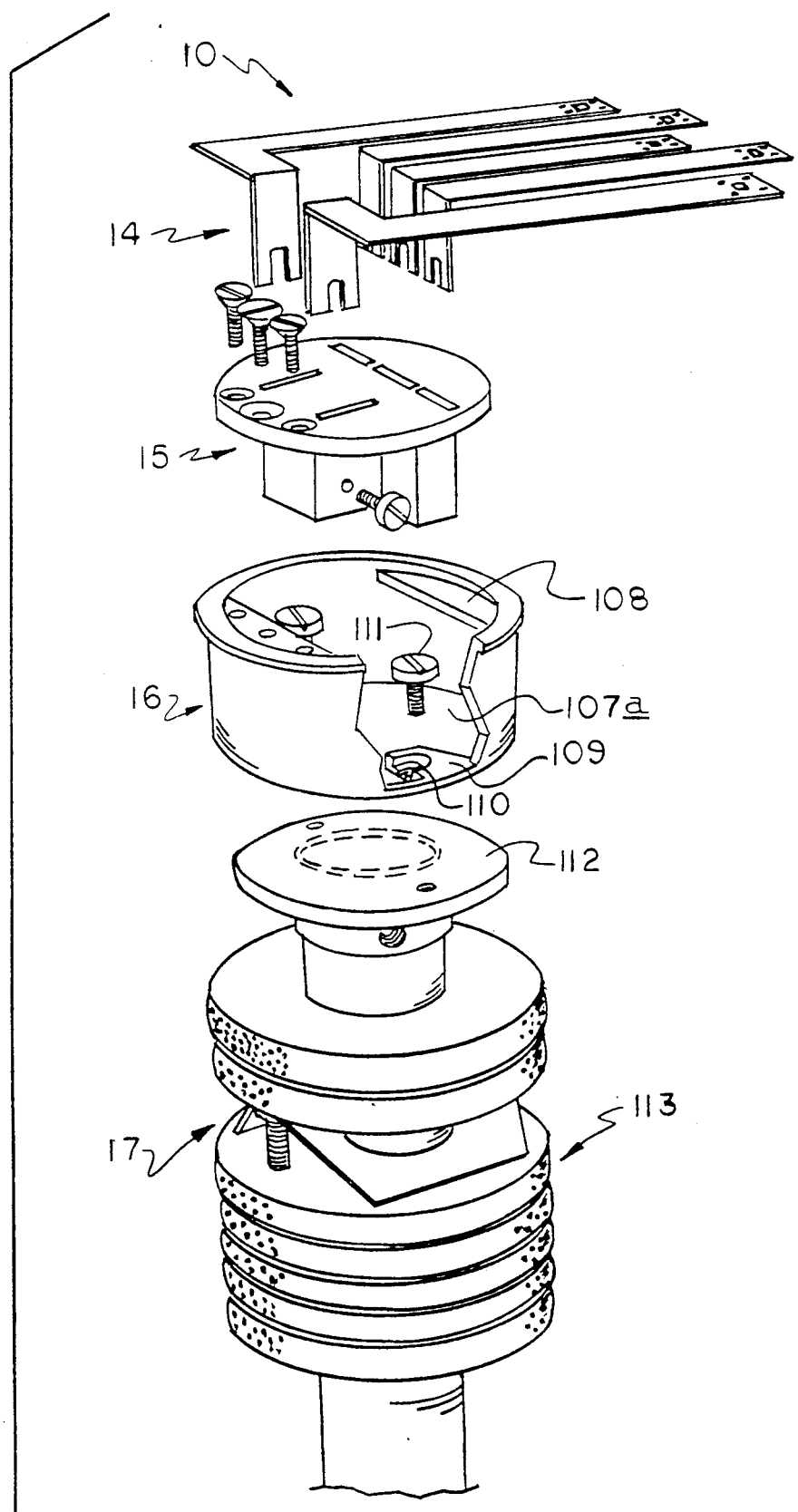
FIG. 8 is an exploded view illustrating the invention as employed with a poke-thru.

In FIG. 8 the numeral 14 designates an array of flat conductors which normally will have the same structure as the conductors of the array 1, the numeral 15 designates an adaptor which normally will have the same structure as the adaptor 2, the numeral 16 designates an adaptor housing which has a structure different from the housings 3, 7, and 12, but serves the same general purpose and the numeral 17 designates mounting means for the adaptor housing which in this case is a poke-thru.

Returning now to FIGS. 1-5, I will comment on the preferred structure of the components illustrated.

The array 1 has five flat conductors 18, 19, 20, 21, and 22. One end of each conductor terminates in a right angle bend, the bent ends being designated as 23, 24, 25, 26, ad 27. Each bent end has a clearance opening such as the openings or slots 28 and 29 for the bent ends 26 and 27.

The opposite end of each conductor has a group of barbs, the respective groups being designated at 30, 31, 32, 33, and 34. Each group is for use in connecting its conductor to a conductor of a flat cable and each group preferably has the same structure. The foregoing will be explained later.

It is to be noted here that the flat conductors of the array 1 are encapsulated in flat plastic sheets. As encapsulated, the conductors 19, 20, and 21 are at one level while the conductors 18 and 22 are at a slightly higher level. The foregoing will be explained later.

With respect to the array 1, the following will be observed. The conductor 20 is disposed centrally and thus, is the center conductor of the array. The pair of conductors 19 and 21 are outboard of the center conductor 20, respectively on opposite sides of the center conductor 20. The pair of conductors 18 and 22 are outboard of the outboard pair 19 and 21 on opposite sides thereof.

Further, it will be observed that the bent ends 24, 25, and 27 are arranged in line, end-to-end, so that the same all lie in a common plane. The bent ends 24, 25, and 27 may be offset, but the positions shown are preferred.

Additionally, with respect to the conductors 18 and 22, there are sections 35 and 36 which extend inwardly toward the center conductor 20. Thus, the bent ends 23 and 26 lie respectively in parallel planes which are normal to the plane containing the ends 24, 25, and 27.

Each group of barbs 30-34 has the same structure and the explanation of structure will be done in connection with FIGS. 4, and 5 wherein FIG. 4 is a plan view of the conductor 20 with bent end 25 and group 32. The group 32 is comprised of a center barb 40 and four outboard barbs 41, 42, 43, and 44. Except for physical size the barbs 40-44 have the same structure. The center 40 has four sharp, projecting parts or prongs, three of which are designated at 45, 46, and 47. The barb 41 has four prongs, three of which are noted at 50, 51, and 52. The manner in which the various barbs are employed will be described later on.

The structure of adaptor 2 will be explained in connection with FIGS. 1 and 2.

The adapter has a flat, circular closure section 53 and underneath the same is a connector section 54. The connector section 54 is T-shaped in cross section, a head portion being designated at 55 and a leg portion at 56.

The closure section 53 has a group of three receiving slots 60, 61, and 62 and a group of two receiving slots 63 and 64. The head section 55 has a surfacing 65 (FIG. 2) which is aligned with the slots 60, 61, and 62. The leg section 56 has surfacing disposed on opposite sides of the leg section and respectively aligned with slots 63 and 64. The surfacing on the leg aligned with slot 63 is indicated at 67.

The head 55 has three threaded apertures which are open to the surfacing 65, one of such threaded apertures being indicated at 68. The leg 56 also has a pair of threaded apertures open to its surfacing, one of such apertures being indicated at 69.

The three screws 70 are adapted to be threaded into the apertures 68. A pair of screws are adapted to be threaded into the threaded apertures in the leg 56. The screw for threaded aperture 69 is indicated at 71.

The three slots 60, 61, and 62 are adapted to respectively receive the bent ends 24, 25, and 27 and, therefore, are set up with respect to one another for the purpose. The slots 60, 61, and 62 extend substantially in line, end-to-end and each slot is in alignment with the surfacing 65.

The two slots 63 and 64 are adapted to respectively receive the bent ends 26 and 23 and are set up for that purpose. The slots 63 and 64 extending parallel one another and are normal to the slots 60, 61, and 62. The slots 63 and 64 are respectively aligned with the surfacing on the leg 56.

The three screws 73 are employed for securing the adaptor in place. The center screw 73 serves as a grounding screw and the two outboard screws 73 serve to secure the adaptor to the adaptor housing. The foregoing will be noted later on.

The adaptor is molded from a poly-carbonate, preferably LEXAN 740. The threaded holes in the adaptor are formed by drilling and then press-fitting in each hole conventional Barb-Sert which is made of brass and is internally threaded. One of such Barb-Serts is indicated at 74 in FIG. 3.

The structure of the adaptor housing 3 will be explained in connection with FIG. 1.

The housing 3 is annular in form with a central opening 75 for the passage of power conductors, with external threads 76 and with a flange or platform 77 which extends around the inside of the housing. The wide portion 78 of the platform has three threaded holes 79 for receiving the screws 73. The adaptor housing is preferably die cast aluminum.

As will be evident, the closure section 53 of the adaptor fits down into the adaptor housing and engages and is supported by the platform 77. The outboard screw 73 hold the adaptor in position.

The mount 4 for adaptor housing 3 will next be explained in connection with FIGS. 1 and 3.

A section of an underfloor duct is indicated at 80. Such ducts are adapted to carry power conductor assemblies one of which is indicated at 81 in FIG. 3. The top 82 of the duct carries a preset 83 aligned with an opening 84 in the top 82. The preset 83 is internally threaded at 85. The adaptor housing 3 is secured in the preset 82 by the engagement of the respective threads 76 and 85 as noted in FIG. 3. The preset 83 is held in place on the duct 80 by flanges 86 which are forced against the top and bottom sides of the top 82 in the area around the opening 84.

Before describing how the flat conductors and the round conductors are interconnected, I will comment more in detail on the arrangements of FIGS. 6, 7, and 8.

The arrangement shown in FIG. 6 is for an afterset application. The structure is identical as the structure of FIG. 1 except for the afterset 90.

The afterset 90 fits over the opening 91 in duct 92 and is secured thereto by a pair of fingers one of which is shown at 93. These fingers are shown in U.S. Pat. No. 3,322,442 assigned to the assignee of this application. The afterset has an opening 94 for passing the power conductor assemblies and is internally threaded at 95 to receive the adaptor housing 7.

The arrangement of FIG. 7 is also for an afterset application but with different forms of afterset and adaptor housing.

The duct 96 has an opening 97 over which is disposed the afterset 13b. The afterset 13b is secured in position by a finger arrangement as noted in FIG. 6, one of the fingers being indicated at 98. The afterset has an opening 99 for the passage of power conductor assemblies. Extending upward from the bottom of the afterset are three posts 100, each having a thread hole on the top thereof. The adaptor housing 12 is disc-like in form with a flange or platform 101 which has internal opening 102. The platform 101 has three threaded apertures 103 to receive adaptor hold-down screws such as the screws 73. Also, the platform 101 has three clearance apertures 104 to receive screws 105 which are threaded into apertures 106 in the adjusting ring 13a. The adjusting ring 13a is mounted on the afterset 13b by the screws 107 engaging the threaded holes in posts 100.

The arrangement shown in FIG. 8 is for a poke-thru application.

The adaptor housing 16 has an opening 107a and platform means 108. The platform 108 holds the adaptor 15. The bottom of the housing has a pair of inwardly projecting bosses one of which is indicated at 109. The boss 109 has clearance opening 110 which receives a screw 111. The screw 111 connects the adaptor housing to the poke-thru retainer 112 connected to the top of a poke-thru 113.

Figure 9:
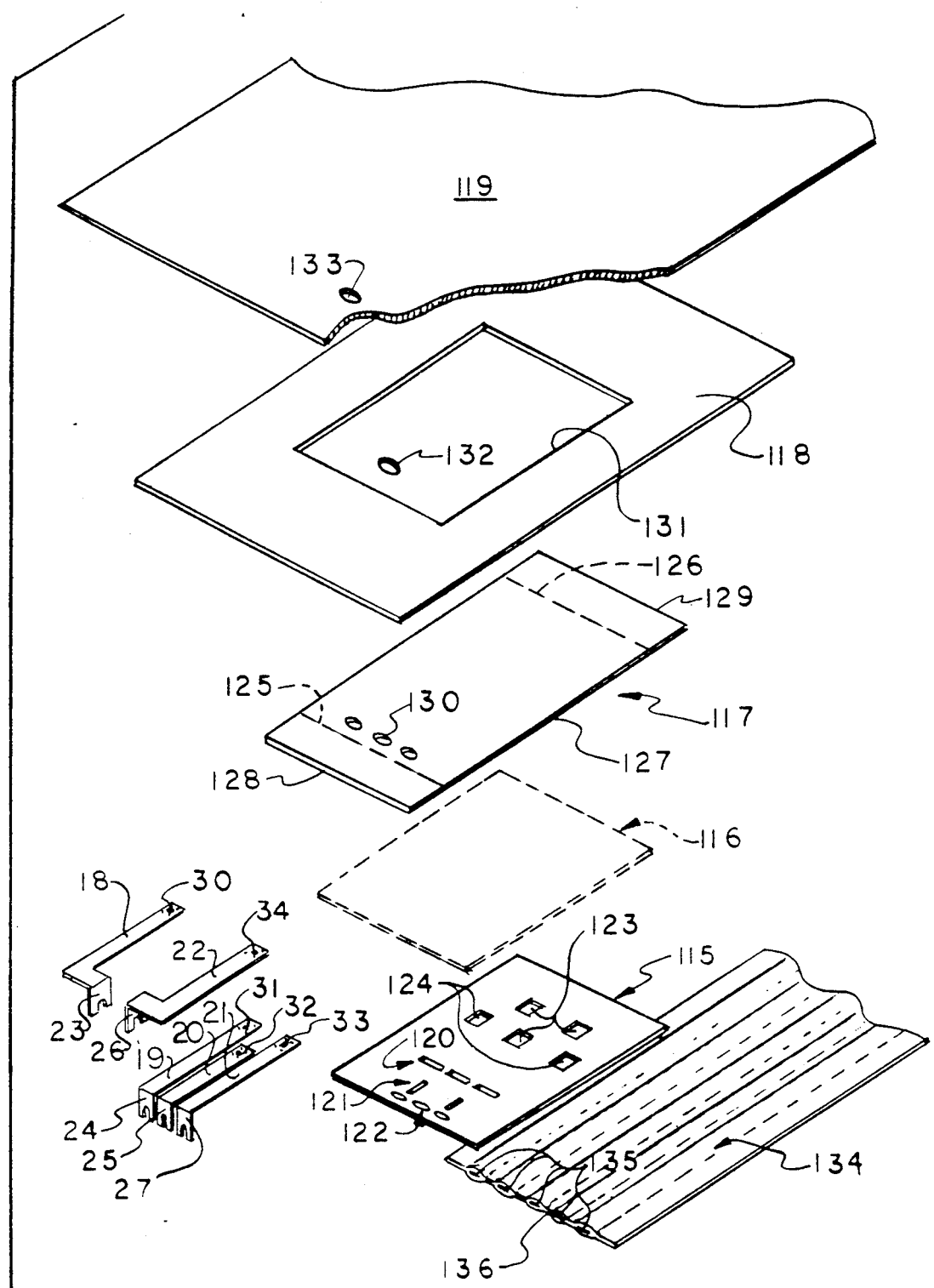
FIG. 9 is an exploded view of components which may be employed on the floor for making the flat and round cable interconnection.

Referring to FIG. 9, typical components which may be used for an actual installation will be described. Various of these components are described in copending application Ser. No. 254,154. Reference may be had to that application for additional details.

The numeral 115 indicates a lower insulator, the numeral 116 indicates an inner insulator, the numeral 117 indicates an upper insulator, the numeral 118 indicates an upper patch, and the numeral 119 indicates a metal protective strip. A metal strip such as strip 119 is conventionally used to protect flat conductor cable. The flat conductors illustrated on the left hand side have the same numerals a previously employed.

The lower insulator 115 is formed from a sheet of clear polyester film with clearance apertures 120 for the bent ends 24, 25, and 27, clearance apertures 121 for bent ends 23 and 26, and clearance apertures 122 for the screws 73. Also formed in the insulator are the clearance apertures 123 for passage of the barbs 31 and 33 and clearance apertures 124 for the barbs 30, 32, and 34.

. The inner insulator 116 is the same physical size and has the same kind of clearance apertures as the lower insulator 115 and for that reason is shown in dotted outline. In addition, however, the inner insulator 116 has a paper backing on one side which is adhesively secured so that it can be peeled away to expose the adhesive.

The upper insulator 117 is formed of a sheet of clear polyester film with a layer of paper on the one side secured by an adhesive permitting the paper to be peeled away. The paper is cut at 125 and 126 to make an inner paper section 127 and outer paper sections 128 and 129. The plastic film of the upper insulator 117 has three clearance apertures 130 for the screws 73.

The upper patch 118 comprises a sheet of foam with paper adhesively secured to one side and with a sheet of clear polyester film adhesively secured to the opposite side. The adhesive for the paper permits the same to be peeled away to expose the adhesive while the adhesive between the plastic film and foam makes a permanent bond. The foam sheet is made with a central cut-out to form an opening or window 131. The plastic sheet and the center paper section are formed with a clearance aperture 132 for the center grounding screw 73.

In the arrangement of FIG. 9, the lower insulator 115, the inner insulator 116, the upper insulator 117, and conductors 18–22 are all joined together as a package or junction splice. The way in which this is accomplished will be noted below.

First, a fixture is made which will accomodate the insulators 115–117 and which has cavities to accept the barb group 30–34, the bent ends 23–27, and the screws 73. The cavity normally will have positioning pins for the insulators and the flat conductors.

The lower insulator is placed in the fixture. The flat conductors 19, 20, and 21 are placed down on the top of the insulator with the barbs and bent ends protruding through the respective clearance apertures and into the fixture cavity.

The paper backing is peeled from the inner insulator and the insulator with the adhesive surface facing downwardly is put on the top of the lower insulator and over the flat conductors 19, 20, and 21. The adhesive on the inner insulator holds the same on the lower insulator and also holds the conductors 19, 20, and 21 in fixed position.

The flat conductors 18 and 22 are then placed down on the top of the inner insulator 116 with the barbs and bent ends extending down through the clearance apertures and into the cavities in the figure.

Next, the paper center section 127 of upper insulator 117 is peeled off (the paper on end sections 128 and 129 remains) and with the adhesive surface facing downwardly the insulator is put down over the inner insulator. The adhesive joins the upper and inner insulators and holds the flat conductors 18 and 22 in position.

From the foregoing description it will be seen that the flat conductors 18–22 are enclosed within the plastic sheets 115, 116, and 117 with the bent ends extending through the lower sheet 115 and outwardly (normal) to the sheet. The group of barbs 30–34 also extending through and outwardly of the lower sheet.

The foregoing assembly of the sheets and flat conductors is termed a junction splice. The outwardly extending bent ends can be connected to the round power conductors and the barbs can connect the flat conductors of the splice to the flat conductors of a flat cable assembly. The foregoing will now be explained.

A typical flat conductor cable, represented at 134, has five flat conductors 135. The end 136 of the cable is cut square as shown. As will be more apparent later on, the barbs 30–34 are separated by lateral distances which correspond to the separation between cable 135. The axially staggered position of the barbs is preferred.

For purposes of description, assume a typical installation includes a preset such as preset 83 shown in FIG. 1. Also, it is to be presumed that the desired preset has been selected and the concrete topping and mud cap have been removed so that the power conductor assemblies in the duct are accessible.

The next step in the process is to join up the junction splice and the adaptor and mount the same in the preset.

The adaptor housing 3 is positioned in the preset as shown in FIG. 3 and turned so that a line through the apertures 79 is normal to the direction of the run of flat conductor cable. Then the power conductor assemblies in the duct are pulled out through the preset on the floor surface. The end of each conductor is stripped of insulation and provided with a connecting loop either by bending over the end or by securing a terminal, the bending arrangement being preferred. Next, the junction splice and adaptor are manipulated so that the bent ends 23–27 are fitted into the slots 60–64. One-by-one each loop on a power conductor is aligned with the slot in the appropriate bent end and a screw (70/71) is passed through the clearance apertures in the loop and slot and into the threaded aperture in the adaptor. When a screw is tightened up, the loop and bent end are in electrical contact and are firm against the surfacing on the adaptor.

The foregoing will be noted in FIG. 3 where the bent end 25 extends down through slot 61 and is engaged with the loop 114. The screw 70 holds the loop and bent end firm against the surfacing 65.

Now the combined junction splice and adaptor are put into position by placing the adaptor on platform 77 and putting in the outboard hold down screws 79. The next step is to electrically interconnect the conductors in the junction splice and the conductors in the run of flat conductor cable 134.

The cable 134 is placed under the junction splice so that the barbs are aligned with the appropriate conductors of the cable. While holding the barb/conductor in alignment, a crimping tool (which has flat top and bottom jaws) is used successively on each of the barbs to force the prongs of the barbs into the conductors in the cable. The paper backings on end sections 128 and 129 are then peeled away and the end section put down respectively on the floor and on the top of the flat conductor cable.

Now the upper patch 118 is taken and the paper peeled from the adhesive surface. With the adhesive surface facing downwardly, the patch is placed in position with the window 131 over the upper insulator 117 and with the clearance aperture 132 aligned with the middle clearance aperture 130 in upper insulator. The adhesive on the peripheral edge of the patch 118 will secure the patch to the floor.

Next a hole such as 133 is punched at the proper location in the strip 119 and the strip placed down on the upper patch 118 with the hole 133 aligned with the center clearance aperture 130. A grounding screw is then placed through the clearance apertures in the insulators and into the threaded aperture 79 of the metal adaptor housing 3.

It is contemplated that the joinder of the flat and round conductors be accomplished without the use of the upper patch. In such cases, the metal strip 119 is placed directly on the upper insulator 117.

What is claimed is:

1. In a building:
   a concrete floor having a bore extending between the top of the floor and the bottom of the floor;
   a flat-conductor cable on the top of said floor;
   a junction splice section on said floor adjacent said bore and having mechanism making an electrical connection with each conductor of said flat conductor cable;
   a plurality of round power conductors extending from underneath the surface of said floor up into said bore; and
   means including an adaptor in said bore, the adaptor having means electrically connected with said junction splice section and with flat conductors and electrically connecting the flat and round conductors together.

2. In a building:
   a concrete floor having a bore extending between the top of the floor and the bottom of the floor;
   a flat-conductor cable on the top of said floor;
   a junction splice section including a plurality of flat conductors on said floor and each enclosed in electrical insulating material and each flat conductor having a bent connector end free from the insulating material and extending outwardly thereof and also having an opposite end having mechanism making a electrical connection with a conductor of said flat conductor cable;
   a plurality of round power conductors extending from underneath the floor up into said bore and each power conductor terminating in a joinder end;
   an adaptor made of electrically non-conductive material;
   means mounting said adaptor in said bore; and
   means on the adaptor receiving said bent connector ends and receiving said joinder ends and respectively electrically connecting the ends.

3. In a building:
   a concrete floor having a bore extending between the top of the floor and the bottom of the floor;
   a plurality of flat conductors on said floor adjacent said bore, each enclosed in electrical insulating material and each flat conductor terminating on the floor as by a connector end;
   a plurality of round power conductors extending from underneath the floor up into said bore and each power conductor terminating inside the bore in a joinder end;
   an adaptor made of electrically non-conductive material;
   means mounting said adaptor in said bore; and
   means on the adaptor respectively engaging said connector ends and engaging said joinder ends and respectively electrically connecting the ends.

4. In a building:
   a concrete floor having a bore extending between the top of the floor and the bottom of the floor;
   an adaptor made of electrically non-conductive material in said bore having a closure section and a connector section, the closure section having a plurality of receiving slots and the connector section having surfacing aligned with the receiving slots and the connector section having a plurality of threaded apertures open to the surfacing;
   means mounting said adaptor in said bore and having opening means providing a passageway for power conductors;
   a plurality of flat conductors each enclosed in electrical insulating material and each flat conductor having a bent connector end having a clearance opening therein and which is free from the insulating material and extends outwardly of the insulating material and the opposite end of each flat conductor having mechanism configured for connection to a flat conductor of a flat conductor cable;
   said bent ends respectively extending through said receiving slots and being engaged with said surfacing and aligned with the threaded apertures therein;
   a plurality of round power conductors extending from underneath the floor up into said bore and each power conductor terminating in a loop, the loops respectively engaging said bent ends and respectively being in alignment with said clearance openings in said bent ends; and
   a plurality of screws, the threaded shanks of which respectively extend through said loops and clearance openings and are threaded into said threaded apertures and the heads of said screws holding said bent ends and said loops firmly in engagement with one another and against the surfacing of said connector section whereby said flat conductors and said power conductors are electrically connected.

5. The combination of claim 4 wherein said means mounting said adaptor in said bore comprises:
   a duct embedded in said concrete floor, the duct having an access opening providing for the passage of said power conductors;
   an annular insert mounted on the top of said duct in alignment with said access opening and having an opening providing for the passage of said power conductors;
   an annular adaptor housing mounted on said insert, the adaptor housing having an opening providing for a passageway for said power conductors and having platform means mounting said adaptor.

6. The combination of claim 4 wherein said means mounting said adaptor comprises:
   an annular adaptor housing having an opening providing a passageway for said power conductors and platform means mounting said adaptor; and
   a poke-thru retainer connected to the bottom of said annular housing, the retainer having means for mounting a poke-thru.

7. The combination of claim 4 wherein:
   said mechanism comprises barb means free from the insulating material; and
   said plurality of flat conductors are enclosed in a plurality of plastic sheets including upper and lower sheets and the said bent ends and barb means extend through and away from said lower sheet.

8. The combination of claim 7 wherein:
   said adaptor has a clearance aperture;
   said means mounting said adaptor in said bore has a threaded grounding aperture;
   there is a metal strip disposed over said plastic sheets, the strip having a clearance aperture; and
   there is a grounding screw, the head of which engages said metal strip and the shank of which extends through the clearance apertures in said metal strip, said plastic sheets, said adaptor and threadingly engages said grounding aperture bore.

9. An adaptor for use in connecting flat conductors of flat conductor cable and the round conductors of a power cable, comprising:

a circular closure section and a connector section extending away from the closure section;

a plurality of receiving slots in said closure section;

surfacing on said connector section aligned with said receiving slots; and a plurality of threaded apertures in said connector section and open to said surfacing.

10. The adaptor of claim 9 wherein said connector section is T-shaped in cross section being formed by a head portion and a leg portion with each portion having at least par of said surfacing.

11. The adaptor of claim 10 wherein there are five of said slots arranged in a group of three slots and a group of two slots, the group of three slots extending end-to-end substantially in line and each slot is in alignment with the surfacing on said head portion and the group of two slots extending parallel with one another and normal to said three slots, and each slot aligned with the surfacing on said leg portion.

12. In a junction splice for connecting the round conductors of a power cable with the flat conductors of a flat conductor cable:

a plurality of flat conductors;

each said conductor having one end bent at a right angle with a clearance opening therein and the opposite end having a plurality of barbs, the bent ends being for use in interengaging the round conductors of a power cable and the barbs being for use in connecting said plurality of flat conductors of the junction splice to the flat conductors of a flat conductor cable; and insulating means surrounding said plurality of flat conductors of the junction splice, said bent ends extending outwardly of the insulating means.

* * * * *